US012746533B2

(12) United States Patent
Nishio et al.

(10) Patent No.: US 12,746,533 B2
(45) Date of Patent: Sep. 29, 2026

(54) EXHAUST GAS PURIFICATION DEVICE AND METHOD FOR MANUFACTURING EXHAUST GAS PURIFICATION DEVICE

(71) Applicants: Takahiro Nishio, Miyoshi (JP); Shogo Shirakawa, Toyota (JP); Hiroki Shirakawa, Toyota (JP); Nobuyuki Takagi, Toyota (JP); Tomomasa Aikawa, Fukuroi (JP); Hiroki Nihashi, Hamamatsu (JP); Takahiro Noguchi, Hamamatsu (JP)

(72) Inventors: Takahiro Nishio, Miyoshi (JP); Shogo Shirakawa, Toyota (JP); Hiroki Shirakawa, Toyota (JP); Nobuyuki Takagi, Toyota (JP); Tomomasa Aikawa, Fukuroi (JP); Hiroki Nihashi, Hamamatsu (JP); Takahiro Noguchi, Hamamatsu (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 523 days.

(21) Appl. No.: 18/318,277

(22) Filed: May 16, 2023

(65) Prior Publication Data

US 2024/0017246 A1 Jan. 18, 2024

(30) Foreign Application Priority Data

May 23, 2022 (JP) ................................. 2022-083686

(51) Int. Cl.
*B01J 21/04* (2006.01)
*B01D 53/94* (2006.01)
(Continued)

(52) U.S. Cl.
CPC .......... *B01J 23/58* (2013.01); *B01D 53/9472* (2013.01); *B01J 21/04* (2013.01); *B01J 23/10* (2013.01);
(Continued)

(58) Field of Classification Search
CPC .... B01J 23/464; B01J 35/393; B01J 37/0244; B01D 53/945; B01D 53/9454;
(Continued)

(56) References Cited

U.S. PATENT DOCUMENTS 11,504,704 B2 * 11/2022 Chinzei .................... B01J 35/19
2011/0126528 A1 * 6/2011 Yamada ............. B01D 53/9468
60/299
(Continued)

FOREIGN PATENT DOCUMENTS

CN 114109568 A 3/2022
JP 2016-147256 A 8/2016
(Continued)

OTHER PUBLICATIONS

Machine translation of Takashi et al (JP2021/126636A), publication date Sep. 2, 2021.*

*Primary Examiner* — Jun Li
(74) *Attorney, Agent, or Firm* — Sughrue Mion, PLLC

(57) ABSTRACT

The exhaust gas purification device includes: a substrate including an upstream and a downstream ends; a first catalyst layer extending across a first region and containing a first rhodium-containing catalyst and a first cerium-containing oxide, the first rhodium-containing catalyst containing a first metal oxide carrier and first rhodium particles supported on the first metal oxide carrier, a mean of a particle size distribution of the first rhodium particles being 1.5 nm to 18 nm; and a second catalyst layer extending across a second region and containing a second rhodium-
(Continued)

containing catalyst containing a second metal oxide carrier and second rhodium particles supported on the second metal oxide carrier, a cerium content in the first catalyst layer based on a volume capacity of the substrate in the first region being higher than a cerium content in the second catalyst layer based on a volume capacity of the substrate in the second region.

12 Claims, 5 Drawing Sheets

(51) Int. Cl.

| | |
|---|---|
| ***B01J 23/10*** | (2006.01) |
| ***B01J 23/46*** | (2006.01) |
| ***B01J 23/58*** | (2006.01) |
| ***B01J 35/00*** | (2024.01) |
| ***B01J 35/04*** | (2006.01) |
| ***B01J 35/23*** | (2024.01) |
| ***B01J 35/30*** | (2024.01) |
| ***B01J 35/56*** | (2024.01) |
| ***B01J 37/02*** | (2006.01) |
| ***B01J 37/08*** | (2006.01) |
| ***F01N 3/28*** | (2006.01) |

(52) U.S. Cl.

CPC ............. *B01J 23/464* (2013.01); *B01J 35/19* (2024.01); *B01J 35/23* (2024.01); *B01J 35/393* (2024.01); *B01J 35/56* (2024.01); *B01J 37/0205* (2013.01); *B01J 37/0228* (2013.01); *B01J 37/0236* (2013.01); *B01J 37/0244* (2013.01); *B01J 37/0248* (2013.01); *B01J 37/088* (2013.01); *F01N 3/2828* (2013.01); *B01D 2255/1023* (2013.01); *B01D 2255/1025* (2013.01); *B01D 2255/2042* (2013.01); *B01D 2255/2065* (2013.01); *B01D 2255/9032* (2013.01); *B01D 2255/9202* (2013.01); *B01D 2259/4566* (2013.01); *F01N 2330/06* (2013.01); *F01N 2330/32* (2013.01); *F01N 2370/02* (2013.01)

(58) Field of Classification Search

CPC ........... B01D 2255/9025; F01N 3/2803; F01N 2510/0684

See application file for complete search history.

(56) References Cited

U.S. PATENT DOCUMENTS

| | | | | |
|---|---|---|---|---|
| 2017/0234185 | A1* | 8/2017 | Nobukawa | F01N 3/0814 60/274 |
| 2017/0296969 | A1* | 10/2017 | Ohashi | B01D 53/945 |
| 2020/0030775 | A1* | 1/2020 | Kitamoto | B01J 23/464 |
| 2020/0070126 | A1 | 3/2020 | Hara et al. | |
| 2020/0078769 | A1* | 3/2020 | Andersen | B01J 23/44 |
| 2022/0062884 | A1 | 3/2022 | Chinzei et al. | |
| 2022/0152593 | A1* | 5/2022 | Chiba | B01J 37/0215 |
| 2022/0176352 | A1* | 6/2022 | Ohashi | F01N 3/2828 |
| 2023/0381748 | A1* | 11/2023 | Hirao | B01J 35/19 |

FOREIGN PATENT DOCUMENTS

| | | | | |
|---|---|---|---|---|
| JP | 2021-126636 | A | 9/2021 | |
| JP | 2022-039147 | A | 3/2022 | |
| WO | 2018/147408 | A1 | 8/2018 | |
| WO | WO-2020008981 | A1 * | 1/2020 | F01N 3/28 |
| WO | WO-2020202990 | A1 * | 10/2020 | B01J 23/63 |
| WO | WO-2020203424 | A1 * | 10/2020 | B01J 23/63 |
| WO | WO-2022097498 | A1 * | 5/2022 | B01J 37/0244 |

* cited by examiner

EXHAUST GAS PURIFICATION DEVICE AND METHOD FOR MANUFACTURING EXHAUST GAS PURIFICATION DEVICE

CROSS REFERENCE TO RELATED APPLICATIONS

The present application claims priority from Japanese patent application JP 2022-083686 filed on May 23, 2022, the entire content of which is hereby incorporated by reference into this application.

BACKGROUND

Technical Field

The present disclosure relates to an exhaust gas purification device and a method for manufacturing the exhaust gas purification device.

Background Art

An exhaust gas discharged from an internal combustion engine used in a vehicle, such as an automobile, contains a harmful component, such as carbon monoxide (CO), hydrocarbon (HC), and nitrogen oxide (NOx). Regulations on emission amounts of these harmful components have been tightened year by year. To remove these harmful components, a noble metal, such as platinum (Pt), palladium (Pd), and rhodium (Rh), has been used as a catalyst.

Meanwhile, from an aspect of resource risk, reduction in usage of the noble metal has been demanded. As one method for reducing the usage of the noble metal in an exhaust gas purification device, there has been known a method in which a noble metal is supported on a carrier in a form of fine particles. For example, JP 2016-147256 A discloses a method for producing an exhaust gas purification material that includes a step of supporting noble metal particles on an oxide carrier to produce a noble metal supported catalyst and a step of performing a heating process on the noble metal supported catalyst under a reducing atmosphere to control sizes of the noble metal particles within a predetermined range.

Additionally, J P 2021-126636 A discloses an exhaust gas purification catalyst device that can efficiently remove NOx in both of an oxygen deficient atmosphere and an oxygen excess atmosphere. The exhaust gas purification catalyst device disclosed in JP 2021-126636 A includes a substrate and a front side catalyst coat layer and a rear side catalyst coat layer on the substrate. The front side catalyst coat layer contains a catalyst noble metal and inorganic oxide particles substantially free of an Oxygen Storage Capacity (OSC) material. The rear side catalyst coat layer contains a catalyst noble metal and inorganic oxide particles containing an OSC material. The catalyst noble metals contained in the front side catalyst coat layer and the rear side catalyst coat layer contain Rh and are substantially free of a catalyst noble metal other than Rh.

SUMMARY

Intensive studies by the present inventors revealed that NOx removal performance of the exhaust gas purification catalyst device described in JP 2021-126636 A had a tendency to deteriorate under a high temperature environment.

The present disclosure provides an exhaust gas purification device and a method for manufacturing the same having high OSC performance and allowing efficient removal of NOx even after exposure to a high temperature environment.

The present disclosure provides the following aspects, for example.

1. An exhaust gas purification device comprising:
   a substrate including an upstream end through which an exhaust gas is introduced into the device and a downstream end through which the exhaust gas is discharged from the device, the substrate having a length (Ls) between the upstream end and the downstream end;
   a first catalyst layer extending across a first region, the first region extending between the downstream end and a first position, the first position being at a first distance (La) from the downstream end toward the upstream end, the first catalyst layer containing a first rhodium-containing catalyst and a first cerium-containing oxide, the first rhodium-containing catalyst containing a first metal oxide carrier and first rhodium particles supported on the first metal oxide carrier, a mean of a particle size distribution of the first rhodium particles being from 1.5 nm to 18 nm; and
   a second catalyst layer extending across a second region, the second region extending between the upstream end and a second position, the second position being at a second distance (Lb) from the upstream end toward the downstream end, the second catalyst layer containing a second rhodium-containing catalyst containing a second metal oxide carrier and second rhodium particles supported on the second metal oxide carrier,
   wherein a cerium content in the first catalyst layer based on a volume capacity of the substrate in the first region is higher than a cerium content in the second catalyst layer based on a volume capacity of the substrate in the second region.
2. The exhaust gas purification device according to Aspect 1,
   wherein a standard deviation of the particle size distribution of the first rhodium particles is less than 1.6 nm.
3. The exhaust gas purification device according to Aspect 1 or 2,
   wherein the mean of the particle size distribution of the first rhodium particles is more than 4 nm and equal to or less than 14 nm.
4. The exhaust gas purification device according to any one of Aspects 1 to 3,
   wherein the first rhodium-containing catalyst contains the first rhodium particles in an amount of 0.01 wt % to 2 wt % based on a total weight of the first metal oxide carrier and the first rhodium particles.
5. The exhaust gas purification device according to any one of Aspects 1 to 4,
   wherein the mean of the particle size distribution of the second rhodium particles is from 0.1 nm to 1.0 nm.
6. The exhaust gas purification device according to any one of Aspects 1 to 5, further comprising
   a third catalyst layer containing palladium particles, the third catalyst layer extending across a third region, the third region extending between the upstream end and a third position, the third position being at a third distance (La) from the upstream end toward the downstream end.
7. The exhaust gas purification device according to any one of Aspects 1 to 6, wherein the length (Ls), the first distance (La), and the second distance (Lb) meet $Ls < La+Lb \leq 1.2\ Ls$.

8. The exhaust gas purification device according to any one of Aspects 1 to 7,
   wherein the cerium content in the first catalyst layer based on the volume capacity of the substrate in the first region is twice or more the cerium content in the second catalyst layer based on the volume capacity of the substrate in the second region.
9. The exhaust gas purification device according to any one of Aspects 1 to 8,
   wherein at least one of the first metal oxide carrier or the second metal oxide carrier is a composite oxide containing alumina and zirconia as main components.
10. A method for manufacturing the exhaust gas purification device according to any one of Aspects 1 to 9, the method comprising:
   preparing the first rhodium-containing catalyst containing the first metal oxide carrier and the first rhodium particles supported on the first metal oxide carrier, wherein the first rhodium particles have a mean of the particle size distribution of from 1.5 nm to 18 nm;
   preparing the second rhodium-containing catalyst containing the second metal oxide carrier and the second rhodium particles supported on the second metal oxide carrier;
   forming the first catalyst layer containing the first rhodium-containing catalyst and the first cerium-containing oxide in the first region extending between the downstream end of the substrate and the first position, the first position being at the first distance (La) from the downstream end toward the upstream end; and
   forming the second catalyst layer containing the second rhodium-containing catalyst in the second region extending between the upstream end of the substrate and the second position, the second position being at the second distance (Lb) from the upstream end toward the downstream end.
11. The method according to Aspect 10,
   wherein the preparing the first rhodium-containing catalyst includes:
   impregnating the first metal oxide carrier with a first rhodium compound solution;
   drying the first metal oxide carrier impregnated with the first rhodium compound solution; and
   heating the dried first metal oxide carrier to a temperature within a range from 700° C. to 900° C. under an inert atmosphere to obtain the first rhodium-containing catalyst.
12. The method according to Aspect 11,
   wherein the inert atmosphere is a nitrogen atmosphere.
13. The method according to Aspect 11 or 12,
   wherein the preparing the second rhodium-containing catalyst includes:
   impregnating the second metal oxide carrier with a second rhodium compound solution; and
   drying the second metal oxide carrier impregnated with the second rhodium compound solution to obtain the second rhodium-containing catalyst.
14. The method according to any one of Aspects 11 to 13, further comprising
   forming a third catalyst layer containing palladium particles in a third region extending between the upstream end of the substrate and a third position, the third position being at a third distance (Lc) from the upstream end toward the downstream end.

The exhaust gas purification device of the present disclosure has high OSC performance and allows efficient removal of a harmful component even after exposure to a high temperature environment.

DETAILED DESCRIPTION

Figure 1:
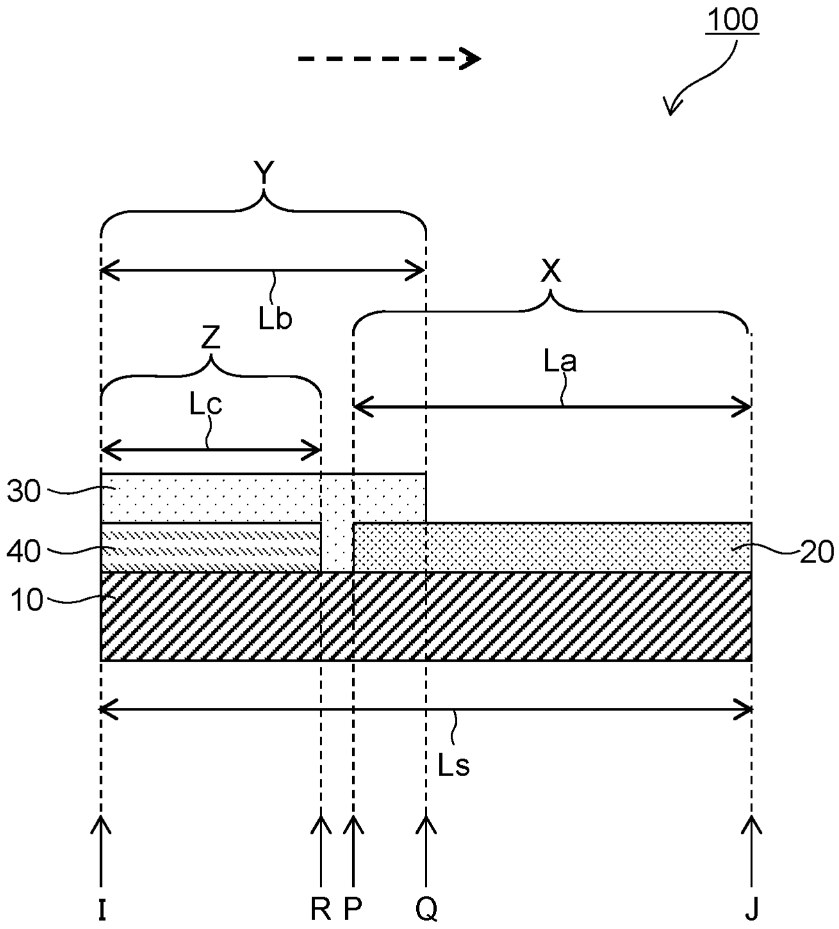
FIG. 1 is an enlarged end view of a main part of an exhaust gas purification device according to an embodiment taken along a surface parallel to a flow direction of an exhaust gas and schematically illustrating a configuration at a proximity of a partition wall of a substrate.

The following will describe embodiments with reference to the drawings as appropriate. In the drawings referred in the following description, the same reference numerals may be used for the same members or the members having similar functions, and their repeated explanations may be omitted in some cases. There may be a case where a dimensional ratio in a drawing differs from the actual ratio for convenience of explanation, or a part of the member is omitted in a drawing. A numerical range expressed herein using the term "to" includes respective values described before and after the term "to" as a lower limit value and an upper limit value. Upper limit values and lower limit values in numerical ranges disclosed herein can be arbitrarily combined.

I. Exhaust Gas Purification Device

An exhaust gas purification device 100 according to an embodiment will be described with reference to FIGS. 1 and 2. The exhaust gas purification device 100 according to the embodiment includes a substrate 10, a first catalyst layer 20, a second catalyst layer 30, and a third catalyst layer 40.

(1) Substrate 10

The substrate 10 is not specifically limited, and any substrate that can be used as the substrate for the exhaust gas purification device can be used. For example, as illustrated in FIG. 2, the substrate 10 may include a frame portion 12 and partition walls 16 that partition a space inside the frame portion 12 to define a plurality of cells 14. The frame portion 12 and the partition walls 16 may be integrally formed. The frame portion 12 may have any shape, such as a cylindrical shape, an elliptical cylindrical shape, or a polygonal cylindrical shape. The partition walls 16 are disposed to extend between a first end (first end surface) I and a second end (second end surface) J of the substrate 10 to define the plurality of cells 14 extending between the first end I and the second end J. Each cell 14 may have any cross-sectional shape, such a quadrilateral shape (e.g., a square, a parallelogram, a rectangular, or a trapezoid), a triangular shape, and any other polygonal shape (e.g., a hexagon or an octagon), or a circular shape. Each of the plurality of cells 14 may be closed at either of the first end I or the second end J, or may be opened at both of the first end I and the second end J.

Examples of the material of the substrate 10 include ceramic, such as cordierite ($2MgO \cdot 2Al_2O_3 \cdot 5SiO_2$), aluminum titanate, silicon carbide, silica, alumina, and mullite, and a metal, such as stainless steel containing chrome and aluminum. These materials allow the exhaust gas purification device 100 to exhibit high exhaust gas purification performance even under a high temperature condition. From the aspect of cost reduction, the substrate 10 may be made from cordierite.

Figure 2:
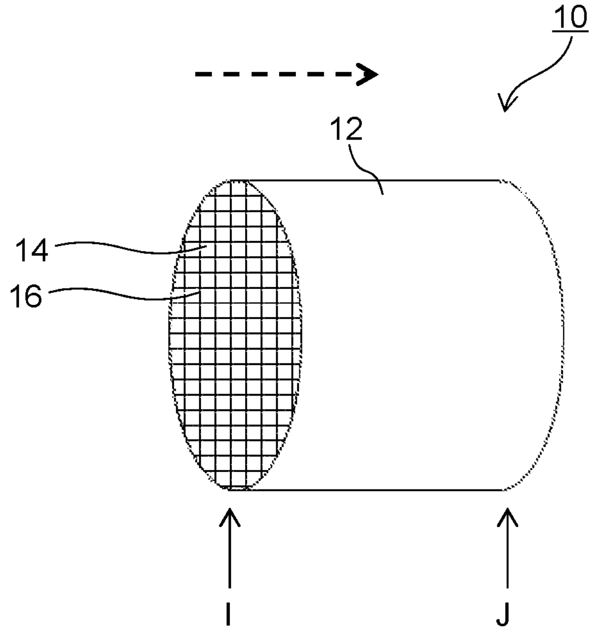
FIG. 2 is a perspective view schematically illustrating an example of the substrate.

In FIGS. 1 and 2, the dashed arrows indicate a flow direction of an exhaust gas in the exhaust gas purification device 100 and the substrate 10. The exhaust gas is introduced into the exhaust gas purification device 100 through the first end I, and discharged from the exhaust gas purification device 100 through the second end J. Therefore, hereinafter, the first end I will also be referred to as an upstream end I and the second end J will also be referred to as a downstream end J as appropriate. A length between the upstream end I and the downstream end J, that is, the total length of the substrate 10 is herein denoted as Ls.

(2) First Catalyst Layer 20

The first catalyst layer 20 is disposed on the substrate 10 and extends across a first region X extending between the downstream end J and a first position P, which is at a first distance La from the downstream end J toward the upstream end I (that is, in a direction opposite to the flow direction of the exhaust gas). The first distance La may be from 40% to 65% of the total length Ls of the substrate 10.

The first catalyst layer 20 contains a first rhodium-containing catalyst. The first rhodium-containing catalyst contains a first metal oxide carrier and first rhodium (Rh) particles supported on the first metal oxide carrier.

Examples of the first metal oxide carrier include an oxide of at least one metal selected from the group consisting of metals of the group 3, the group 4, and the group 13 in the periodic table of elements and lanthanoid-based metals. When the first metal oxide carrier contains two or more metal elements, the first metal oxide carrier may be a mixture of oxides of the two or more metal elements, may be a composite oxide containing the two or more metal elements, or may be a mixture of an oxide of at least one metal element and at least one composite oxide.

For example, the first metal oxide carrier may be an oxide of at least one metal selected from the group consisting of scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al), an oxide of at least one metal selected from the group consisting of Y, La, Ce, Ti, Zr and Al in some embodiments, and an oxide of at least one metal selected from the group consisting of Al, Ce, and Zr in some embodiments. The first metal oxide carrier may be an oxide containing zirconia ($ZrO_2$) as the main component, may be an Al—Zr-based composite oxide, which is a composite oxide containing zirconia and alumina $(Al_2O_3)_a$s the main components, or may be an Al—Ce—Zr-based composite oxide, which is a composite oxide containing zirconia, alumina, and ceria ($CeO_2$) as the main components. The zirconia may serve to maintain catalytic activity of the first Rh particles. The ceria may serve as an Oxygen Storage Capacity (OSC) material which stores oxygen in an atmosphere under an oxygen excess atmosphere and discharges oxygen under an oxygen deficient atmosphere. In some embodiments, the first metal oxide carrier does not contain Ce because particle sizes of the Rh particles on the ceria are likely to increase under a high temperature environment. The alumina may serve to control diffusion of the first Rh particles. The first metal oxide carrier may be a composite oxide containing at least one of alumina, ceria, or zirconia as the main component(s), and further containing at least one of yttria ($Y_2O_3$), lanthana ($La_2O_3$), neodymia ($Nd_2O_3$), or praseodymia ($Pr_6O_{11}$). Yttria, lanthana, neodymia, and praseodymia improve heat resistance of the composite oxide.

Note that the phrase "contain as the main component(s)" herein means that the content of the referred component is 50 wt % or more, 70 wt % or more, 80 wt % or more, or 90 wt % or more of the total weight. When a plurality of main components are present, the phrase means that the sum of the contents of the components is 50 wt % or more, 70 wt % or more, 80 wt % or more, or 90 wt % or more.

The first metal oxide carrier may be particulate, and may have any appropriate particle size.

The first Rh particles supported on the first metal oxide carrier function as a catalyst to remove harmful components contained in an exhaust gas and mainly function as a catalyst to reduce NOx. A mean of a particle size distribution of the first Rh particles is within the range from 1.5 nm to 18 nm. Generally, the smaller the particle sizes of the particles are, the larger specific surface area the particles have, and therefore the higher catalyst performance the particles can exhibit. However, the Rh particle having an excessively small particle size (for example, a particles size less than about 1 nm) tends to easily coarsen due to Ostwald ripening and aggregation etc. under a high temperature environment, leading to deterioration of catalyst performance. When the mean of the particle size distribution of the first Rh particles is 1.5 nm or more, a small number of particles that easily coarsen is present, and therefore the deterioration of catalyst performance of the first Rh particles under a high temperature environment is reduced or prevented. When the mean of the particle size distribution of the first Rh particles is 18 nm or less, the first Rh particles have sufficiently large specific surface areas, and therefore the first Rh particles can provide high catalyst performance. The mean of the particle size distribution of the first Rh particles may be from 3 nm to 17 nm, more than 4 nm and equal to or less than 14 nm, or more than 4 nm and equal to or less than 8 nm.

Additionally, the standard deviation of the particle size distribution of the first Rh particles may be less than 1.6 nm. When the standard deviation of the particle size distribution of the first Rh particles is less than 1.6 nm, a small number of coarse Rh particles and a small number of fine Rh particles likely to coarsen under a high temperature environment are present. Therefore, even after the exhaust gas purification device is exposed to a high temperature environment, the first Rh particles can have the sufficiently large specific surface area, and as a result, the high catalyst performance can be provided. The standard deviation of the particle size distribution of the first Rh particles may be 1 nm or less.

The particle size distribution of the first Rh particles herein is a particle size distribution on the number basis (i.e., a number-weighted particle size distribution) determined by measuring a projected area equivalent circle diameter of 50 or more of the first Rh particles using an image obtained with a transmission electron microscope (TEM).

The amount of the supported first Rh particles, that is, the proportion of the first Rh particles based on the total weight of the first metal oxide carrier and the first Rh particles, may be within the range from 0.01 wt % to 2 wt %. The proportion of the first Rh particles of 0.01 wt % or more allows satisfactory removal of the harmful components from the exhaust gas by virtue of the sufficient amount of the first Rh particles present. The proportion of the first Rh particles of 2 wt % or less allows reducing the amount of Rh used, and additionally allows exhibiting sufficient durability against a high temperature because coarsening of the Rh particles under a high temperature environment is avoided or controlled owing to sparseness of the first Rh particles supported on the metal oxide carrier. The proportion of the first Rh particles based on the total weight of the first metal oxide carrier and the first Rh particles may be within the range from 0.2 wt % to 1.8 wt %.

The content of the first Rh particles in the first catalyst layer 20 may be, for example, from 0.05 g/L to 5 g/L, from 0.08 g/L to 2 g/L, or from 0.1 g/L to 1 g/L, based on the volume capacity of the substrate in the first region X. This allows the exhaust gas purification device 100 to have a sufficiently high exhaust gas purification performance.

The first catalyst layer 20 further contains a first cerium-containing oxide. The first cerium-containing oxide serves as an OSC material. The first cerium-containing oxide may be ceria or a composite oxide containing ceria (for example, a composite oxide containing ceria as the main component, a Ce—Zr-based composite oxide, which is a composite oxide containing ceria and zirconia as the main components, or an Al—Ce—Zr-based composite oxide, which is a composite oxide containing alumina, ceria, and zirconia as the main components). Especially, the Ce—Zr-based composite oxide may be used in some embodiments because the Ce—Zr-based composite oxide has high oxygen storage capacity and are relatively inexpensive. The Ce—Zr-based composite oxide may have a pyrochlore crystalline structure. In addition to the main component(s), the composite oxide containing ceria may further contain at least one of lanthana, yttria, neodymia, or praseodymia as an additive, and the additives may form a composite oxide together with the main component(s). The OSC material may be particulate, and may have any appropriate particle size.

The Ce content (in terms of Ce atoms) in the first catalyst layer 20 may be, for example, more than 0 g/L and equal to or less than 20 g/L, based on the volume capacity of the substrate in the first region X, and may be from 5 g/L to 20 g/L, based on the volume capacity of the substrate in the first region X in some embodiments. This allows the exhaust gas purification device 100 to have high OSC performance.

The first catalyst layer 20 may further contain any other component. Examples of the any other component include a binder and an additive.

(3) Second Catalyst Layer 30

The second catalyst layer 30 is disposed on the substrate 10 and extends across a second region Y extending between the upstream end I and a second position Q, which is at a second distance Lb from the upstream end I toward the downstream end J (that is, in the flow direction of the exhaust gas). The second distance Lb may be from 40% to 70% of the total length Ls of the substrate 10. The length Ls of the substrate, the first distance La, and the second distance Lb may meet $Ls<La+Lb\leq 1.2\ Ls$. That is, a length of a region where the first catalyst layer 20 overlaps with the second catalyst layer 30 may be more than 0% and equal to or less than 20% of the total length Ls of the substrate 10. This allows the exhaust gas purification device 100 to have high OSC performance. In the region where the first catalyst layer 20 overlaps with the second catalyst layer 30, the second catalyst layer 30 may be formed on the first catalyst layer 20 as shown in FIG. 1, or the first catalyst layer 20 may be formed on the second catalyst layer 30.

The second catalyst layer 30 contains a second rhodium-containing catalyst. The second rhodium-containing catalyst contains a second metal oxide carrier and second rhodium (Rh) particles supported on the second metal oxide carrier.

Examples of the material usable as the second metal oxide carrier are the same as the examples of the materials usable as the first metal oxide carrier as listed above.

The second Rh particles supported on the second metal oxide carrier function as a catalyst to remove harmful components contained in an exhaust gas and mainly function as a catalyst to reduce NOx. As described later, the content of Ce, which promotes formation of coarse Rh particles under a high temperature environment, in the second catalyst layer 30 is smaller than the content of Ce in the first catalyst layer 20, and therefore the second Rh particles are less likely to coarsen compared with the first Rh particles. Therefore, the mean of the particle size distribution of the second Rh particles is not specifically limited. From a perspective of ease of production, the mean of the particle size distribution of the second Rh particles may be within the range, for example, from 0.1 nm to 1.0 nm. The standard deviation of the particle size distribution of the second Rh particles may be within the range from 0.01 nm to 0.3 nm.

The particle size distribution of the second Rh particles herein is a particle size distribution on the number basis (i.e., a number-weighted particle size distribution) determined by measuring a projected area equivalent circle diameter of 50 or more of the second Rh particles using an image obtained with a transmission electron microscope (TEM).

The amount of the supported second Rh particles, that is, the proportion of the second Rh particles based on the total weight of the second metal oxide carrier and the second Rh particles, may be within the range from 0.01 wt % to 2 wt %. The proportion of the second Rh particles of 0.01 wt % or more allows satisfactory removal of the harmful components from the exhaust gas by virtue of the sufficient amount of the second Rh particles present. The proportion of the second Rh particles of 2 wt % or less allows reducing the amount of Rh used, and additionally allows exhibiting sufficient durability against a high temperature because coarsening of the Rh particles under a high temperature environment is avoided or controlled owing to sparseness of the second Rh particles supported on the metal oxide carrier. The proportion of the second Rh particles based on the total weight of the second metal oxide carrier and the second Rh particles may be within the range from 0.2 wt % to 1.8 wt %.

The content of the second Rh particles in the second catalyst layer 30 may be, for example, from 0.05 g/L to 5 g/L, from 0.08 g/L to 2 g/L, or from 0.1 g/L to 1 g/L, based on the volume capacity of the substrate in the second region Y. This allows the exhaust gas purification device 100 to have a sufficiently high exhaust gas purification performance.

The second catalyst layer 30 may further contain second cerium-containing oxide. Examples of the material usable as the second cerium-containing oxide are the same as the examples of the materials usable as the first cerium-containing oxide as listed above.

The Ce content (in terms of Ce atoms) in the second catalyst layer 30 may be, for example, from 0 g/L to 30 g/L, based on the volume capacity of the substrate in the second region Y. The Ce content (in terms of Ce atoms) in the second catalyst layer 30 based on the volume capacity of the substrate in the second region Y is smaller than the Ce content (in terms of Ce atoms) in the first catalyst layer 20 based on the volume capacity of the substrate in the first region X. When the first catalyst layer 20, which is positioned more downstream than the second catalyst layer 30 in the flow direction of the exhaust gas, contains a higher amount of the ceria, which functions as the OSC material, the exhaust gas purification device 100 exhibits the improved OSC performance. The Ce content in the first catalyst layer 20 based on the volume capacity of the substrate in the first region X may be twice or more, specifically five times or more, the Ce content in the second catalyst layer 30 based on the volume capacity of the substrate in the second region Y. This allows the OSC performance of the exhaust gas purification device 100 to be further improved.

The second catalyst layer 30 may further contain any other component. Examples of the any other component include a binder and an additive.

(4) Third Catalyst Layer 40

The third catalyst layer 40 is disposed on the substrate 10 and extends across a third region Z extending between the upstream end I and a third position R, which is at a third distance Lc from the upstream end I toward the downstream end J (that is, in the flow direction of the exhaust gas). The third distance Lc may be from 15% to 35% of the total length Ls of the substrate 10. The length Ls of the substrate, the first distance La, and the third distance Lc may meet $La+Lc<Ls$. That is, there need not be a region where the first catalyst layer 20 overlaps with the third catalyst layer 40. There being no region where the first catalyst layer 20 overlaps with the third catalyst layer 40 allows the exhaust gas purification device 100 to have further high NOx removal performance. While the second catalyst layer 30 is formed on the third catalyst layer 40 in the embodiment shown in FIG. 1, the third catalyst layer 40 may be formed on the second catalyst layer 4030.

The third catalyst layer 40 contains palladium (Pd) particles. The Pd particles function as a catalyst to remove a harmful component contained in an exhaust gas, and mainly function as a catalyst to oxidize HC. Similarly to the Rh particles, the smaller the sizes of the Pd particles are, the higher catalyst performance the Pd particles exhibit, but the more likely the Pd particles coarsen under a high temperature environment. However, even when a mean of a particle size distribution of the Pd particles is within the range from 1.5 nm to 18 nm similarly to the first Rh particles, coarsening of the Pd particles cannot be avoided or controlled. Therefore, the mean of the particle size distribution of the Pd particles is not specifically limited. From a perspective of ease of production, the mean of the particle size distribution of the Pd particles may be within the range, for example, from 0.5 nm to 10 nm, and a standard deviation of the particle size distribution of the Pd particles may be within the range from 0.1 nm to 3.0 nm.

The particle size distribution of the Pd particles herein is a particle size distribution on the number basis (i.e., a number-weighted particle size distribution) determined by measuring a projected area equivalent circle diameter of 50 or more of the Pd particles using an image obtained with a transmission electron microscope (TEM) or a scanning electron microscope (SEM).

The content of the Pd particles in the third catalyst layer 40 may be, for example, from 0.1 g/L to 20 g/L, based on the volume capacity of the substrate in the third region Z, may be from 1 g/L to 15 g/L, based on the volume capacity of the substrate in the third region Z, in some embodiments, or may be from 3 g/L to 9 g/L, based on the volume capacity of the substrate in the third region Z, in some embodiments. This allows the exhaust gas purification device 100 to have a sufficiently high exhaust gas purification performance.

The third catalyst layer 40 may further contain another component, such as a carrier to support the Pd particles, an OSC material, and a barium compound.

As the carrier of the Pd particles, for example, the metal oxide carrier can be used, but the carrier is not limited to the metal oxide. The Pd particles can be supported on a carrier by any method, such as an impregnation supporting method, an adsorption supporting method, and a water-absorption supporting method.

Examples of the material usable as the metal oxide carrier are the same as the examples of the materials usable as the first metal oxide carrier as listed above.

Examples of the material usable as the OSC material are the same as the examples of the materials usable as the first cerium-containing oxide as listed above.

The barium compound can prevent or control poisoning of the Pd particles. Examples of the barium compound include barium sulfate, barium carbonate, barium oxide, and barium nitrate. The barium compound may be particulate, and may have any appropriate particle size.

The third catalyst layer 40 may further contain any other component. Examples of the any other component include a binder and an additive.

II. Method for Manufacturing Exhaust Gas Purification Device

An example of the method for manufacturing the exhaust gas purification device 100 according to the embodiment will be described. The method for manufacturing the exhaust gas purification device 100 includes preparing a first rhodium-containing catalyst, preparing a second rhodium-containing catalyst, forming the first catalyst layer 20 in the first region X of the substrate 10, forming the second catalyst layer 30 in the second region Y of the substrate 10, and forming the third catalyst layer 40 in the third region Z of the substrate 10. The first catalyst layer 20, the second catalyst layer 30, and the third catalyst layer 40 may be formed in any order.

An example of the procedure for preparing the first rhodium-containing catalyst will be described. The first rhodium-containing catalyst can be prepared by impregnating a first metal oxide carrier with a first rhodium compound solution, drying the first metal oxide carrier impregnated with the first rhodium compound solution, and heating the dried metal first oxide carrier to a temperature within the range from 700° C. to 900° C. under an inert atmosphere.

Examples of the first rhodium compound solution include an aqueous solution of rhodium hydroxide and an aqueous solution of rhodium nitrate. The impregnation method is not specifically limited. For example, while distilled water is stirred, the first metal oxide carrier and the first rhodium compound solution are added to the distilled water to allow the first metal oxide carrier to be impregnated with the first rhodium compound solution.

Next, the first metal oxide carrier impregnated with the first rhodium compound solution is dried. Baking may be performed after drying as appropriate. Afterwards, the first metal oxide carrier is heated to the temperature within the range from 700° C. to 900° C. under an inert atmosphere. Thus, the first rhodium-containing catalyst containing the first metal oxide carrier and the first Rh particles supported on the first metal oxide carrier is obtained. Examples of the inert atmosphere include a nitrogen atmosphere and an argon atmosphere. The heating period may be any appropriate length of time, and, for example, may be from one to five hours. Heating under the inert atmosphere allows appropriately controlling the particle size distribution of the first Rh particles in the first rhodium-containing catalyst. Specifically, the mean of the particle size distribution of the first Rh particles may be within the range from 1.5 nm to 18 nm, within the range from 3 nm to 17 nm, more than 4 nm and equal to or less than 14 nm, or more than 4 nm and equal to or less than 8 nm, and the standard deviation of the particle size distribution of the first Rh particles may be less than 1.6 nm or equal to or less than 1 nm.

Note that it may be difficult to obtain the particle size distribution as described above through baking under a reducing atmosphere such as a hydrogen atmosphere because the first Rh particles cannot be sufficiently enlarged under the reducing atmosphere. It should also be noted that heating under an oxidation atmosphere, such as an air atmosphere, causes dissolution of Rh into the first metal oxide carrier to form a solid solution, and the first Rh particles on the surface of the first metal oxide carrier possibly decrease.

An example of the procedure for preparing the second rhodium-containing catalyst will be described. The second rhodium-containing catalyst can be prepared by impregnating a second metal oxide carrier with a second rhodium compound solution and drying the second metal oxide carrier impregnated with the second rhodium compound solution. Baking may be performed after drying as appropriate. The first metal oxide carrier need not be heated under an inert atmosphere after the drying and the optional baking. That is, the second rhodium-containing catalyst can be prepared similarly to the first rhodium-containing catalyst except that heating under the inert atmosphere is not required.

The third catalyst layer 40 containing palladium particles is formed in the third region Z of the substrate 10. The third catalyst layer 40 can be formed as follows, for example. First, a third slurry, which is a slurry containing a Pd particle precursor is prepared. As the Pd particle precursor, for example, an appropriate Pd salt of inorganic acid, such as hydrochloride, nitrate, phosphate, sulfate, borate, and hydrofluoride can be used. Alternatively, the third slurry may contain carrier powder on which the Pd particles are supported in advance. The third slurry may further contain any component, such as an OSC material, a binder, or an additive. Properties of the third slurry, such as viscosity and a particle diameter of a solid component, may be adjusted as appropriate. The prepared third slurry is applied over the third region Z of the substrate 10. For example, the third region Z of the substrate 10 is immersed in the third slurry, and after a predetermined period has passed, the substrate 10 is taken out of the third slurry, thus allowing the third slurry to be applied over the third region Z of the substrate 10. Alternatively, the third slurry may be poured from the upstream end I into the substrate 10, and blown with a blower from the upstream end I to be spread toward the downstream end J, thereby allowing the third region Z of the substrate 10 to be coated with the third slurry. Next, the third slurry is dried and baked at a predetermined temperature for a predetermined period. Thus, the third catalyst layer 40 is formed in the third region Z of the substrate 10.

The first catalyst layer 20 containing the first Rh-containing catalyst prepared as described above and the first cerium-containing oxide is formed in the first region X of the substrate 10. For example, the first catalyst layer 20 can be formed as follows. First, a first slurry containing the first Rh-containing catalyst and the first cerium-containing oxide is prepared. The first slurry may further contain any component, such as a binder or an additive. Properties of the first slurry, such as viscosity and a particle diameter of a solid component, may be adjusted as appropriate. The prepared first slurry is applied over the first region X of the substrate 10. For example, the first region X of the substrate 10 is immersed in the first slurry, and after a predetermined period has passed, the substrate 10 is taken out of the first slurry, thus allowing the first slurry to be applied over the first region X of the substrate 10. Alternatively, the first slurry may be poured from the downstream end J into the substrate 10, and blown with a blower from the downstream end J to be spread toward the upstream end I, thereby allowing the first region X of the substrate 10 to be coated with the first slurry. Next, the first slurry is dried and baked at a predetermined temperature for a predetermined period. Thus, the first catalyst layer 20 is formed in the first region X of the substrate 10.

The second catalyst layer 30 containing the second Rh-containing catalyst prepared as described above is formed in the second region Y of the substrate 10. The second catalyst layer 30 can be formed as follows, for example. First, a second slurry containing the second Rh-containing catalyst is prepared. The second slurry may further contain any component, such as an OSC material, a binder, or an additive. Properties of the second slurry, such as viscosity and a particle diameter of a solid component, may be adjusted as appropriate. The prepared second slurry is applied over the second region Y of the substrate 10. For example, the second region Y of the substrate 10 is immersed in the second slurry, and after a predetermined period has passed, the substrate 10 is taken out of the second slurry, thus allowing the second slurry to be applied over the second region Y of the substrate 10. Alternatively, the second slurry may be poured from the upstream end I into the substrate 10, and blown with a blower from the upstream end I to be spread toward the downstream end J, thereby allowing the second region Y of the substrate 10 to be coated with the second slurry. Next, the second slurry is dried and baked at a predetermined temperature for a predetermined period. Thus, the second catalyst layer 30 is formed in the second region Y of the substrate 10.

The exhaust gas purification device according to the embodiment is applicable to various kinds of vehicles including internal combustion engines.

Figure 3:
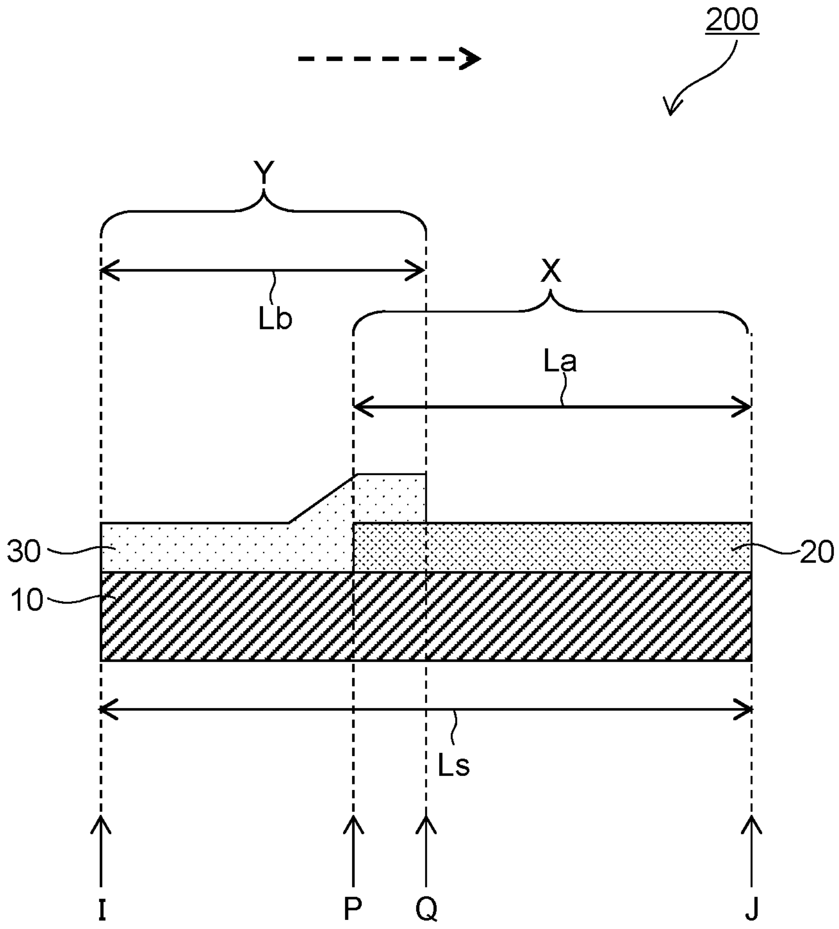
FIG. 3 is an enlarged end view of a main part of an exhaust gas purification device according to a modified embodiment taken along a surface parallel to a flow direction of an exhaust gas and schematically illustrating a configuration at a proximity of a partition wall of a substrate.

While the embodiments of the present disclosure have been described above, the present disclosure is not limited to the above-described embodiments, and can be subjected to various kinds of changes in design without departing from the spirit of the present disclosure described in the claims. For example, the exhaust gas purification device need not include the third catalyst layer 40 described above. That is, an exhaust gas purification device 200 not including the third catalyst layer 40 as illustrated in FIG. 3 is also encompassed in the spirit of the present disclosure.

EXAMPLES

The following will specifically describe the present disclosure with the examples, but the present disclosure is not limited to the examples.

(1) Materials Used in Examples and Comparative Examples a) Substrate (Honeycomb Substrate)

Material: cordierite

Volume capacity: 875 cc

Length: 10.5 cm

Thickness of partition wall: 2 mil (50.8 μm)

Cell density: 600 pieces per square inch

Cross-sectional shape of cell: hexagonal shape b) AZ Particles

The AZ particles are composite oxide particles containing $Al_2O_3$ and $ZrO_2$ as main components and further containing $La_2O_3$, $Y_2O_3$, and $Nd_2O_3$. Weight fractions of the respective components in the AZ particles were $Al_2O_3$: 30 wt %, $ZrO_2$: 60 wt %, $La_2O_3$: 4 wt %, $Y_2O_3$: 4 wt %, and $Nd_2O_3$: 2 wt %.

c) $Al_2O_3$ Particles

The $Al_2O_3$ particles are composite oxide particles containing $Al_2O_3$ as the main component and further containing $La_2O_3$. Weight fractions of the respective components in the $Al_2O_3$ particles were $Al_2O_3$: 96 wt % and $La_2O_3$: 4 wt %.

d) ACZ Particles

The ACZ particles are composite oxide particles containing $Al_2O_3$, $CeO_2$, and $ZrO_2$ as main components and further containing $La_2O_3$, $Y_2O_3$, and $Nd_2O_3$. Weight fractions of the respective components in the ACZ particles were $Al_2O_3$: 30 wt %, $CeO_2$: 20 wt %, $ZrO_2$: 44 wt %, $La_2O_3$: 2 wt %, $Y_2O_3$: 2 wt %, and $Nd_2O_3$: 2 wt %.

e) CZ Particles

The CZ particles are composite oxide particles containing $CeO_2$ and $ZrO_2$ as main components and further containing $La_2O_3$ and $Y_2O_3$. Weight fractions of the respective components in the CZ particles were $CeO_2$: 40 wt %, $ZrO_2$: 50 wt %, $La_2O_3$: 5 wt %, and $Y_2O_3$: 5 wt %.

f) Pyrochlore CZ Particles

The pyrochlore CZ particles are composite oxide particles containing $CeO_2$ and $ZrO_2$ as main components and further containing $Pr_6O_{11}$. Weight fractions of the respective components in the pyrochlore CZ particles were $CeO_2$: 51.4 wt %, $ZrO_2$: 45.6 wt %, and $Pr_6O_{11}$: 3 wt %. In the pyrochlore CZ particles, cerium ions and zirconium ions were arranged on a pyrochlore-type ordered lattice, and parts of the cerium ions and the zirconium ions were replaced by praseodymium. The pyrochlore CZ particles were prepared according to the following procedure.

129.7 g of cerium nitrate hexahydrate, 99.1 g of zirconium oxynitrate dihydrate, 5.4 g of praseodymium nitrate hexahydrate, and 36.8 g of 18% hydrogen peroxide solution were dissolved into 500 g of ion exchanged water, and 340 g of 25% ammonia water was used to obtain a hydroxide precipitate by reverse coprecipitation method. The precipitate was separated with a filter paper, and the obtained precipitate was dried in a drying furnace at 150° C. for seven hours to remove water content, baked in an electric furnace at 500° C. for four hours, and then pulverized.

The obtained powder was molded by applying a pressure of 2000 $kgf/cm^2$ using a pressure molding machine (Wet-CIP).

The obtained molded body was reduced under an Ar atmosphere at 1700° C. in a graphite crucible in which activated carbons were placed for five hours, and after that was baked in an electric furnace at 500° C. for five hours.

The resulting product was pulverized using a vibration mill. Thus, the pyrochlore CZ particles were obtained.

g) Aqueous solution of rhodium nitrate (concentration 2.8 wt %)

h) Aqueous solution of palladium nitrate (concentration 8.0 wt %)

i) Barium sulfate particles (2) Manufacturing Exhaust Gas Purification Device

Examples 1 and 2 a) Preparation of First Rhodium-Containing Catalyst

While distilled water was stirred, the AZ particles and the aqueous solution of rhodium nitrate were added to the distilled water in order of mention. The obtained mixture was dried, and then baked by heating it in an electric furnace under an air atmosphere at 500° C. for two hours. The obtained particles were heated under a nitrogen atmosphere at 850° C. for five hours. Thus, a first Rh-containing catalyst containing the AZ particles and rhodium (Rh) particles supported on the AZ particles was obtained. The first Rh-containing catalyst contained the Rh particles in an amount of 0.60 wt % based on the total weight of the AZ particles and the Rh particles.

The first Rh-containing catalyst was observed with a transmission electron microscope (TEM) to determine the particle size distribution (initial particle size distribution) of the Rh particles (first Rh particles) supported on the ACZ particles. Table 1 shows the mean and the standard deviation of the initial particle size distribution of the first Rh particles.

b) Preparation of Second Rhodium-Containing Catalyst

While distilled water was stirred, the AZ particles and the aqueous solution of rhodium nitrate were added to the distilled water in order of mention. The obtained mixture was dried, and baked by heating it in an electric furnace under an air atmosphere at 500° C. for two hours. Thus, a second Rh-containing catalyst containing the AZ particles and rhodium (Rh) particles supported on the AZ particles was obtained. The second Rh-containing catalyst contained the Rh particles in an amount of 0.94 wt % based on the total weight of the AZ particles and the Rh particles.

The second Rh-containing catalyst was observed with a transmission electron microscope (TEM) to determine the particle size distribution (initial particle size distribution) of the Rh particles (second Rh particles) supported on the ACZ particles. Table 1 shows the mean and the standard deviation of the initial particle size distribution of the second Rh particles.

c) Preparation of Slurry

While distilled water was stirred, the first Rh-containing catalyst, the $Al_2O_3$ particles, the ACZ particles, the pyrochlore CZ particles, and an $Al_2O_3$-based binder were added to the distilled water to prepare a suspended first slurry. While other distilled water was stirred, the second Rh-containing catalyst, the $Al_2O_3$ particles, the ACZ particles, the pyrochlore CZ particles, and an $Al_2O_3$-based binder were added to the distilled water to prepare a suspended second slurry. While yet other distilled water was stirred, the $Al_2O_3$ particles, the CZ particles, the aqueous solution of palladium nitrate, the barium sulfate particles, and an $Al_2O_3$-based binder were added to the distilled water to prepare a suspended third slurry.

d) Formation of Third Catalyst Layer

The third slurry was poured from the upstream end of the substrate, and an excess amount of the third slurry was blown off by a blower. Thus, the layer of the third slurry was formed on the substrate in a third region between the upstream end of the substrate and a third position which was distant from the upstream end toward the downstream end of the substrate by 30% of the total length of the substrate. Next, the substrate was placed on a dryer inside of which was held at 120° C. for two hours to vaporize the water in the third slurry layer. Afterwards, the substrate was heated in an electric furnace at 500° C. for two hours under an air atmosphere to bake the third slurry layer. Thus, the third catalyst layer was formed.

The contents of the $Al_2O_3$ particles, the CZ particles, the Pd particles derived from the aqueous solution of palladium nitrate, and the barium sulfate particles in the third catalyst layer were 25 g/L, 75 g/L, 7 g/L, and 5 g/L, respectively, based on the volume capacity of the substrate in the third region. The inside of the third catalyst layer was observed with a transmission electron microscope (TEM) to determine the particle size distribution of the Pd particles. The mean of the particle size distribution of the Pd particles was 8.7 nm and the standard deviation of the particle size distribution of the Pd particles was 2.1 nm.

e) Formation of First Catalyst Layer

The first slurry was poured from one end (downstream end) of a substrate, and an excess amount of the first slurry was blown off by a blower. Thus, the layer of the first slurry was formed on the substrate in a first region between the downstream end of the substrate and a first position which was distant from the downstream end toward the upstream end of the substrate by 65% of the total length of the substrate. Next, the substrate was placed on a dryer inside of which was held at 120° C. for two hours to vaporize the water in the first slurry layer. Next, the substrate was heated in an electric furnace at 500° C. for two hours under an air atmosphere to bake the first slurry layer. Thus, the first catalyst layer was formed.

The contents of the first Rh-containing catalyst and the $Al_2O_3$ particles in the first catalyst layer were 20.12 g/L (including 20 g/L of the AZ particles and 0.12 g/L of the Rh particles) and 20 g/L, respectively, based on the volume capacity of the substrate in the first region. The contents of the ACZ particles and the pyrochlore CZ particles in the first catalyst layer based on the volume capacity of the substrate in the first region were as shown in Table 1.

f) Formation of Second Catalyst Layer

The second slurry was poured from the upstream end of the substrate, and an excess amount of the second slurry was blown off by a blower. Thus, the layer of the second slurry was formed on the substrate, or on the first catalyst layer or the third catalyst layer in a second region between the upstream end of the substrate and a second position which was distant from the upstream end toward the downstream end of the substrate by 55% of the total length of the substrate. Next, the substrate was placed on a dryer inside of which was held at 120° C. for two hours to vaporize the water in the second slurry layer. Next, the substrate was heated in an electric furnace at 500° C. for two hours under an air atmosphere to bake the second slurry layer. Thus, the second catalyst layer was formed.

The contents of the second Rh-containing catalyst and the $Al_2O_3$ particles in the second catalyst layer were 40.38 g/L (including 40 g/L of the AZ particles and 0.38 g/L of the Rh particles) and 40 g/L, respectively, based on the volume capacity of the substrate in the second region. The contents of the ACZ particles and the pyrochlore CZ particles in the second catalyst layer based on the volume capacity of the substrate in the second region were as shown in Table 1.

Thus, exhaust gas purification devices of Examples 1 and 2 were obtained.

Example 3

A first Rh-containing catalyst was prepared similarly to Example 1, except that the heating temperature under the nitrogen atmosphere was 750° C. Using the thus obtained first Rh-containing catalyst, an exhaust gas purification device was manufactured similarly to Example 1. The mean and the standard deviation of the initial particle size distribution of the first Rh particles in Example 3 were as shown in Table 1.

Example 4

A first Rh-containing catalyst was prepared similarly to Example 1, except that the heating temperature under the nitrogen atmosphere was 900° C. Using the thus obtained first Rh-containing catalyst, an exhaust gas purification device was manufactured similarly to Example 1. The mean and the standard deviation of the initial particle size distribution of the first Rh particles in Example 4 were as shown in Table 1.

Example 5

A second Rh-containing catalyst was prepared similarly to Example 2, except that additional heating was further performed at 850° C. for five hours under a nitrogen atmosphere after the drying and the baking. Using the thus obtained second Rh-containing catalyst, an exhaust gas purification device was manufactured similarly to Example 1. The mean and the standard deviation of the initial particle size distribution of the second Rh particles were as shown in Table 1.

Comparative Examples 1 and 2

Exhaust gas purification devices were manufactured similarly to Example 1, except that the contents of the ACZ particles and the pyrochlore CZ particles of the first catalyst layer based on the volume capacity of the substrate in the first region and the contents of the ACZ particles and the pyrochlore CZ particles of the second catalyst layer based on the volume capacity of the substrate in the second region were as described in Table 1.

Comparative Examples 3 to 5

A first Rh-containing catalyst was prepared similarly to Example 1, except that the heating under the nitrogen atmosphere was not performed. Using the thus obtained first Rh-containing catalysts, exhaust gas purification devices of Comparative Examples 3 to 5 were manufactured similarly to Comparative Example 2 and Examples 1 and 2, respectively. The means and the standard deviations of the initial particle size distributions of the first Rh particles of Comparative Examples 3 to 5 were as shown in Table 1.

(3) Aging Process and Measurement of Average Particle Size of Rh Particles after Aging Process Each of the exhaust gas purification devices was connected to an exhaust system of a V8 engine, a stoichiometric air-fuel mixture (air-fuel ratio A/F=14.6) and a lean air-fuel mixture containing excess oxygen (A/F>14.6) were alternately introduced into the engine with a time ratio of 3:1 at a fixed cycle of time, and a bed temperature of the exhaust gas purification device was maintained at 950° C. for 50 hours. Thus, the exhaust gas purification devices were aged.

(4) OSC Performance Evaluation

The exhaust gas purification device which had been aged as described above was connected to an exhaust system of an L4 engine, an air-fuel mixture with an air-fuel ratio A/F of 14.1 and an air-fuel mixture with an air-fuel ratio A/F of 15.1 were alternately supplied to the engine, and the maximum oxygen storage amount (Cmax) was calculated by the formula: Cmax (g)=0.23×ΔA/F×fuel injection amount. Note that ΔA/F represents a difference between a stoichiometric point and an A/F sensor output. Table 1 and FIG. 4 show the results.

Figure 4:
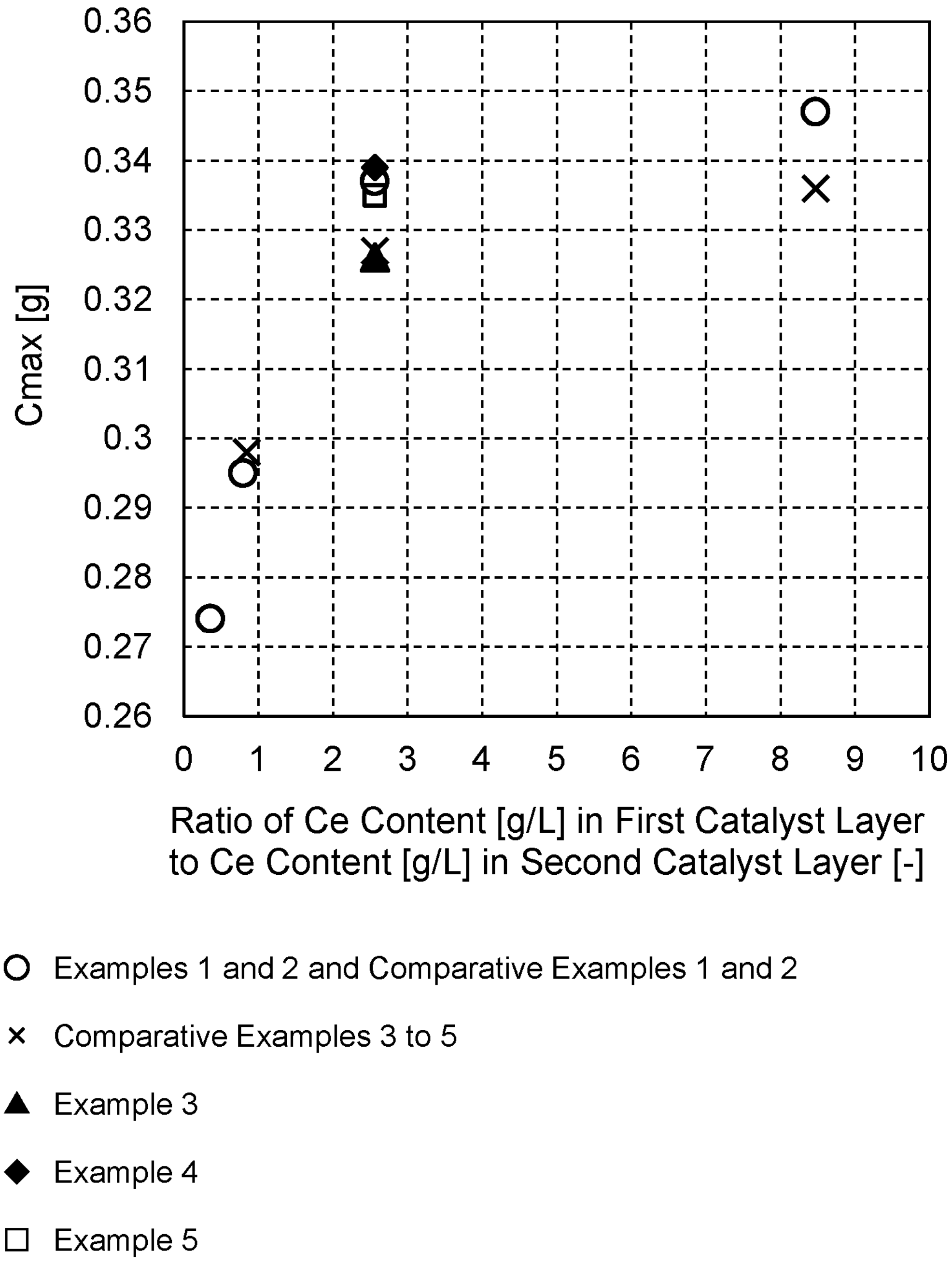
FIG. 4 is a graph showing OSC performances (Cmax) of exhaust gas purification devices of Examples and Comparative Examples after aging at a high temperature.

As shown in FIG. 4, regardless of the initial particle size distribution of the first Rh particles, the higher the ratio of the Ce content in the first catalyst layer to the Ce content in the second catalyst layer, the higher the value of Cmax (that is, the higher the OSC performance). This showed that disposing a large amount of cerium oxide acting as the OSC materials in the downstream region of the exhaust gas purification device lead to high OSC performance.

(5) NOx Removal Performance Evaluation

The exhaust gas purification device which had been aged as described above was connected to an exhaust system of an L4 engine, an air-fuel mixture with an air-fuel ratio A/F of 14.4 was supplied to the engine at an air flow rate of 30 g/s, the bed temperature of the exhaust gas purification device was increased from 200° C. to 500° C. at a rate of 20° C./minute, and "NOx-T50", which was the bed temperature when 50% of NOx in the gas was removed, was measured. Table 1 and FIG. 5 show the results.

Figure 5:
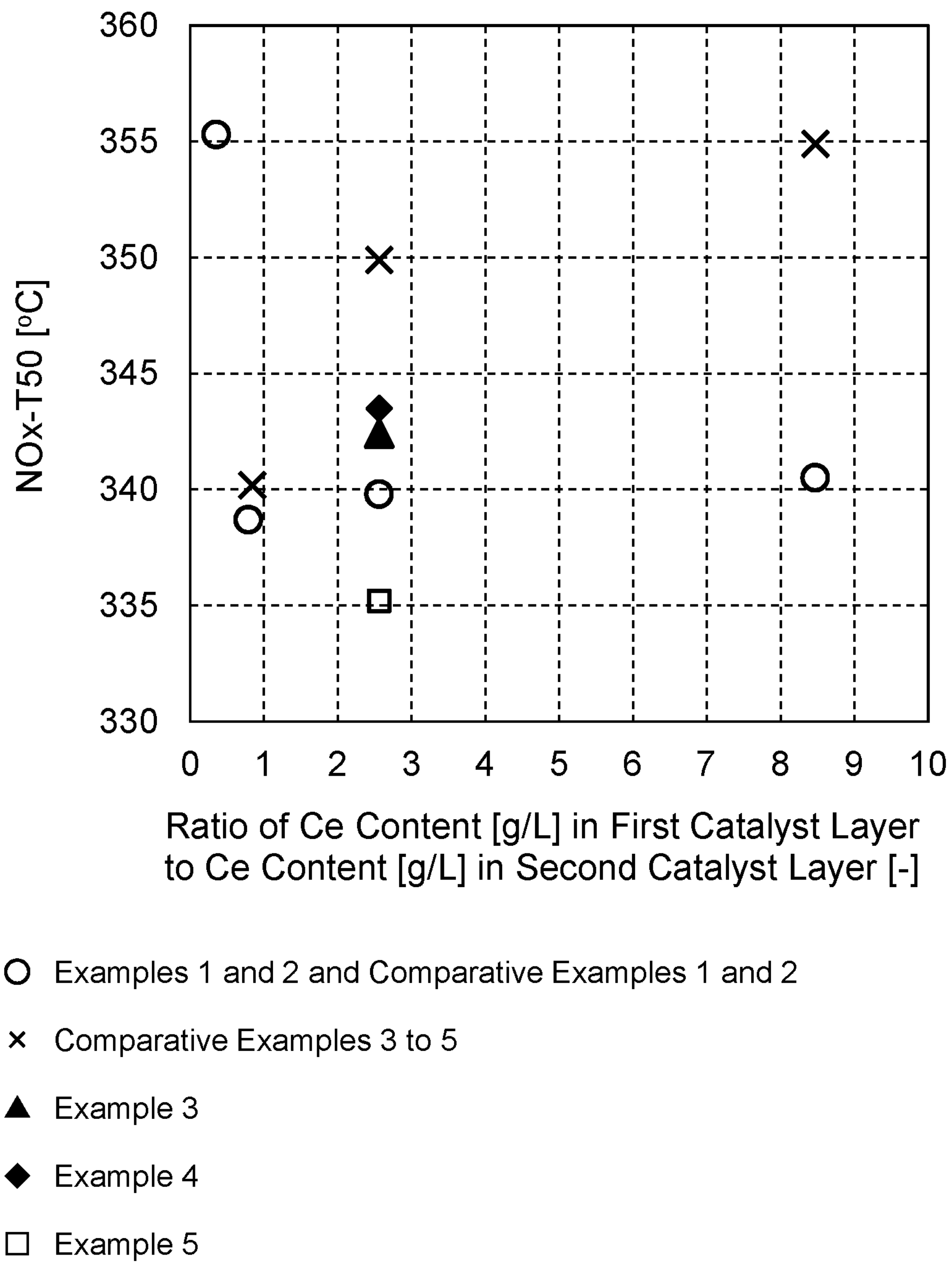
FIG. 5 is a graph showing NOx removal performances (NOx-T50) of exhaust gas purification devices of Examples and Comparative Examples after aging at a high temperature.

As shown in FIG. 5, when the ratio of the Ce content in the first catalyst layer to the Ce content in the second catalyst layer was 0.5 or more, NOx-T50 showed a tendency to get higher (i.e., the NOx removal performance showed a tendency to get worse) as the ratio of the Ce content in the first catalyst layer to the Ce content in the second catalyst layer got higher, regardless of the initial particle size distribution of the first Rh particles. However, the amount of increase in NOx-T50 associated with the increase in the ratio of the Ce layer was more than 1, specifically equal to or more than 2.5, significantly higher NOx removal performance was demonstrated by the exhaust gas purification device in which the mean of the initial particle size distribution of the first Rh particles was 5.49 nm than by the exhaust gas purification device in which the mean of the initial particle size distribution of the first Rh particles was 0.70 nm. It is also shown that higher NOx removal performance was demonstrated by the exhaust gas purification device in which the mean of the initial particle size distribution of the first Rh particles was from 3.36 nm to 7.85 nm than by the exhaust gas purification device in which the mean of the initial particle size distribution of the first Rh particles was 0.70 nm.

Lower NOx-T50 (i.e., higher NOx removal performance) was demonstrated by the exhaust gas purification device in which the mean of the initial particle size distribution of the second Rh particles was 5.45 nm than by the exhaust gas purification device in which the mean of the initial particle size distribution of the second Rh particles was 0.68 nm. However, the difference between them was 4.6° C., which was smaller than 10.1° C., the difference between the NOx-T50 demonstrated by the exhaust gas purification device in which the mean of the initial particle size distribution of the first Rh particles was 5.49 nm and the NOx-T50 demonstrated by the exhaust gas purification device in which the mean of the initial particle size distribution of the first Rh particles was 0.70 nm. The result suggests that controlling the initial particle sizes of the first Rh particles is specifically effective to improve the NOx removal performance.

TABLE 1

| | First Catalyst Layer | | | | Second Catalyst Layer | | | | Ratio of Ce Content [g/L] in | | |
|---|---|---|---|---|---|---|---|---|---|---|---|
| | Mean of Particle Size Distribution of Initial Rh Particles [nm] | Standard Deviation of Particle Size Distribution of Initial Rh Particles [nm] | Content of ACZ Particles [g/L] | Content of Pyrochlore CZ Particles [g/L] | Mean of Particle Size Distribution of Initial Rh Particles [nm] | Standard Deviation of Particle Size Distribution of Initial Rh Particles [nm] | Content of ACZ Particles [g/L] | Content of Pyrochlore CZ Particles [g/L] | First Catalyst Layer to Ce Content [g/L] in Second Catalyst Layer | OSC Performance [g] | NOx-T50 [° C.] |
| Example 1 | 5.49 | 1.49 | 40 | 25 | 0.68 | 0.28 | 15 | 10 | 2.6 | 0.337 | 339.8 |
| Example 2 | 5.49 | 1.49 | 50 | 30 | 0.68 | 0.28 | 15 | 0 | 8.5 | 0.347 | 340.5 |
| Example 3 | 3.36 | 1.16 | 40 | 25 | 0.68 | 0.28 | 15 | 10 | 2.6 | 0.326 | 342.4 |
| Example 4 | 7.85 | 1.59 | 40 | 25 | 0.68 | 0.28 | 15 | 10 | 2.6 | 0.339 | 343.5 |
| Example 5 | 5.49 | 1.49 | 40 | 25 | 5.45 | 1.41 | 15 | 10 | 2.6 | 0.335 | 335.2 |
| Comparative Example 1 | 5.49 | 1.49 | 15 | 10 | 0.68 | 0.28 | 50 | 25 | 0.4 | 0.274 | 355.3 |
| Comparative Example 2 | 5.49 | 1.49 | 30 | 15 | 0.68 | 0.28 | 30 | 20 | 0.8 | 0.295 | 338.7 |
| Comparative Example 3 | 0.70 | 0.23 | 30 | 15 | 0.68 | 0.28 | 30 | 20 | 0.8 | 0.298 | 340.2 |
| Comparative Example 4 | 0.70 | 0.23 | 40 | 25 | 0.68 | 0.28 | 15 | 10 | 2.6 | 0.327 | 349.9 |
| Comparative Example 5 | 0.70 | 0.23 | 50 | 30 | 0.68 | 0.28 | 15 | 0 | 8.5 | 0.336 | 354.9 |

content in the first catalyst layer to the Ce content in the second catalyst layer was smaller in the exhaust gas purification device in which the mean of the initial particle size distribution of the first Rh particles was 5.49 nm than in the exhaust gas purification device in which the mean of the initial particle size distribution of the first Rh particles was 0.70 nm. As a result, when the ratio of the Ce content in the first catalyst layer to the Ce content in the second catalyst

What is claimed is:

1. An exhaust gas purification device comprising:

a substrate including an upstream end through which an exhaust gas is introduced into the device and a downstream end through which the exhaust gas is discharged from the device, the substrate having a length (Ls) between the upstream end and the downstream end;

a first catalyst layer extending across a first region, the first region extending between the downstream end and a first position, the first position being at a first distance (La) from the downstream end toward the upstream end, the first catalyst layer containing a first rhodium-containing catalyst and a first cerium-containing oxide, the first rhodium-containing catalyst containing a first metal oxide carrier and first rhodium particles supported on the first metal oxide carrier, a mean of a particle size distribution of the first rhodium particles being from more than 4 nm and equal to or less than 14 nm;

a second catalyst layer extending across a second region, the second region extending between the upstream end and a second position, the second position being at a second distance (Lb) from the upstream end toward the downstream end, the second catalyst layer containing a second rhodium-containing catalyst containing a second metal oxide carrier and second rhodium particles supported on the second metal oxide carrier; and a third catalyst layer containing palladium particles, the third catalyst layer extending across a third region, the third region extending between the upstream end and a third position, the third position being at a third distance (Lc) from the upstream end toward the downstream end, wherein the second catalyst layer is formed on the third catalyst layer, and wherein a cerium content in the first catalyst layer based on a volume capacity of the substrate in the first region is higher than a cerium content in the second catalyst layer based on a volume capacity of the substrate in the second region.

2. The exhaust gas purification device according to claim 1, wherein a standard deviation of the particle size distribution of the first rhodium particles is less than 1.6 nm.

3. The exhaust gas purification device according to claim 1, wherein the first rhodium-containing catalyst contains the first rhodium particles in an amount of 0.01 wt % to 2 wt % based on a total weight of the first metal oxide carrier and the first rhodium particles.

4. The exhaust gas purification device according to claim 1, wherein the mean of the particle size distribution of the second rhodium particles is from 0.1 nm to 1.0 nm.

5. The exhaust gas purification device according to claim 1, wherein the length (Ls), the first distance (La), and the second distance (Lb) meet $Ls < La + Lb \leq 1.2\ Ls$.

6. The exhaust gas purification device according to claim 1, wherein the cerium content in the first catalyst layer based on the volume capacity of the substrate in the first region is twice or more the cerium content in the second catalyst layer based on the volume capacity of the substrate in the second region.

7. The exhaust gas purification device according to claim 1, wherein at least one of the first metal oxide carrier or the second metal oxide carrier is a composite oxide containing alumina and zirconia as main components.

8. A method for manufacturing the exhaust gas purification device according to claim 1, the method comprising:

preparing the first rhodium-containing catalyst containing the first metal oxide carrier and the first rhodium particles supported on the first metal oxide carrier, wherein the first rhodium particles have a mean of the particle size distribution of from more than 4 nm and equal to or less than 14 nm;

preparing the second rhodium-containing catalyst containing the second metal oxide carrier and the second rhodium particles supported on the second metal oxide carrier;

forming the first catalyst layer containing the first rhodium-containing catalyst and the first cerium-containing oxide in the first region extending between the downstream end of the substrate and the first position, the first position being at the first distance (La) from the downstream end toward the upstream end; and forming the second catalyst layer containing the second rhodium-containing catalyst in the second region extending between the upstream end of the substrate and the second position, the second position being at the second distance (Lb) from the upstream end toward the downstream end.

9. The method according to claim 8, wherein the preparing the first rhodium-containing catalyst includes:

impregnating the first metal oxide carrier with a first rhodium compound solution;

drying the first metal oxide carrier impregnated with the first rhodium compound solution; and heating the dried first metal oxide carrier to a temperature within a range from 700° C. to 900° C. under an inert atmosphere to obtain the first rhodium-containing catalyst.

10. The method according to claim 9, wherein the inert atmosphere is a nitrogen atmosphere.

11. The method according to claim 9, wherein the preparing the second rhodium-containing catalyst includes:

impregnating the second metal oxide carrier with a second rhodium compound solution; and drying the second metal oxide carrier impregnated with the second rhodium compound solution to obtain the second rhodium-containing catalyst.

12. The method according to claim 9, further comprising forming a third catalyst layer containing palladium particles in a third region extending between the upstream end of the substrate and a third position, the third position being at a third distance (Lc) from the upstream end toward the downstream end.

* * * * *